United States Patent [19]

Yukio

[11] Patent Number: 5,445,445
[45] Date of Patent: Aug. 29, 1995

[54] ANTISKID BRAKE SYSTEM HAVING REAR BRAKE APPORTIONING CONTROL

[75] Inventor: Hosoya Yukio, Shizuoka, Japan

[73] Assignee: Nissinbo Industries, Inc., Chuou, Japan

[21] Appl. No.: 200,929

[22] Filed: Feb. 22, 1994

Related U.S. Application Data

[63] Continuation of Ser. No. 972,872, Nov. 5, 1992, abandoned, which is a continuation of Ser. No. 620,428, Nov. 29, 1990, abandoned.

[30] Foreign Application Priority Data

Nov. 29, 1989 [JP] Japan .................. 1-307629

[51] Int. Cl.⁶ .......................... B60T 8/32
[52] U.S. Cl. ................. 303/113.5; 303/9.62; 303/9.69; 303/187
[58] Field of Search ............... 303/116.1, 116.2, 9.69, 303/9.62, 113.1, 113.5, 111

[56] References Cited

U.S. PATENT DOCUMENTS

| | | | |
|---|---|---|---|
| 4,418,966 | 12/1983 | Hattwig | 303/111 |
| 4,962,971 | 10/1991 | Miyake | 303/113 AP |
| 5,021,957 | 6/1991 | Yoshino et al. | 303/13.5 |
| 5,750,788 | 4/1988 | Seibert et al. | 303/111 |

FOREIGN PATENT DOCUMENTS

| | | | |
|---|---|---|---|
| 0051-801 | of 1981 | European Pat. Off. | |
| 0368359 | 5/1990 | European Pat. Off. | 303/111 |
| 3136616 | 3/1983 | Germany | 303/113 AB |
| 59-20648 | of 1984 | Japan | |
| 0001665 | 1/1987 | Japan | 303/111 |
| 0070559 | 3/1990 | Japan | 303/111 |

Primary Examiner—Matthew C. Graham
Attorney, Agent, or Firm—Karl Bozicevic; Fish & Richardson

[57] ABSTRACT

An antiskid control device is disclosed. This device is capable of controlling the braking of a vehicle such as an automobile so as to obtain a reduced stopping distance while simultaneously making it possible to maintain the stability and steerability of the vehicle. The device is comprised of two pressure-mediating circuits provided in two lines leading from a master cylinder. Each circuit is connected first to a front brake, then to the diagonal rear brake and then returns to the reservoir. An inlet valve is interposed in each pressure-mediating circuit between the master cylinder and the front brake. An outlet valve is interposed in the return of each pressure-mediating circuit after the rear brake. The inlet and outlet valves are controlled based on a computation analysis of wheel speed. The device is further characterized by having a normally open opening/closing valve interposed in the pressure-mediating circuit between the line which connects the inlet valve to the front wheel brake, and the line which connects the outlet valve and the rear wheel brake. This opening/closing valve is controlled based on a computational analysis of wheel speed such that if rear wheel lock-up is detected in a given circuit, the opening-closing valve can close and permit pressure to be relieved on the rear brake through the outlet valve while permitting independent control of the braking pressure on the front brake.

6 Claims, 2 Drawing Sheets

ANTISKID BRAKE SYSTEM HAVING REAR BRAKE APPORTIONING CONTROL

This application is a file-wrapper-continuation of now abandoned application Ser. No. 07/972,872 filed Nov. 5, 1992 which is a file-wrapper-continuation of application Ser. No. 07/620,428 filed Nov. 29, 1990 (now abandoned).

FIELD OF THE INVENTION

The present invention relates generally to the field of antiskid (antilock) brake systems for vehicles. More particularly it concerns an improved hydraulic control circuit used in connection with hydraulic vehicle brakes which is capable of simultaneously securing the stability and steerability of a vehicle while obtaining a shortened stopping distance during braking.

BACKGROUND OF THE INVENTION

Modern hydraulic brake systems for vehicles employ two independent hydraulic circuits fed by a double chamber master cylinder. This reduces the likelihood of a total loss of braking efficiency due to a single leak or rupture in the hydraulic system. Two ways of dividing the braking system into these two circuits are currently employed. In the "vertical" system the brakes for the two front wheels are joined in one circuit and the two rear wheels' brakes are joined into the second circuit. In the "diagonal" system the right front and left rear brakes are paired in one circuit and the left front and right rear brakes are paired in the other.

Various antiskid control devices have been developed to prevent the wheels of a vehicle from locking or skidding during braking. In general terms these devices function by controllably moderating the amount of braking action by moderating brake fluid pressure at the brakes at each wheel. This moderating can take place on each of the four wheels individually or it can be arranged to act on individual brake circuits and the two wheels of each such circuit involved.

An antiskid control device generally consists of a wheel speed detecting means, a computational arithmetic means capable of calculating the slip ratio based on wheel speed and an acceleration and a control means to control (modulate) wheel brake force based on the output signal from the computational arithmetic means by modulating hydraulic pressure with electronically controlled valves. Such devices are capable of decelerating a vehicle while regulating the wheel deceleration speed within an appropriate slip ratio by controlling the braking pressure according to the slip conditions of the wheel.

Known antiskid control methods include a diagonal type which controls and modulates the pressure applied to the brake circuit driving the brakes at one front wheel and the opposite rear wheel as pairs and vertical type which controls and modulates the pressure applied to the brakes at the two front wheels and the two rear wheels as pairs.

Conventional antiskid control devices have a number of disadvantages:

(1) Although substantially ideal antiskid control can be realized by providing a braking pressure control device and circuits which control the pressure applied to the brakes at each of the four wheels individually, additional regulating circuits, safety monitoring circuits and other various components are required in addition to the above-mentioned braking pressure control device and circuit for each wheel. This results in high costs and necessitates a large accommodating space.

(2) It is structurally impossible for either the diagonal or vertical type brake control device to independently control the fluid pressure for each wheel in that each of the wheels is paired with another wheel. This creates problems under certain road conditions which result in the application of different coefficients of friction. Under such conditions, the braking pressure for each pair of wheels (whether paired with one another vertically or diagonally) is controlled according to the behavior of the wheel subjected to the lower coefficient of friction. This results in a longer stopping distance because the braking force of the wheel having the higher coefficient of friction is insufficient, (i.e., the braking pressure could be higher and still not result in skidding.

(3) Japanese Application Laid-Open Print No. 59-206248 discloses a diagonal type brake system. This system makes it possible to simultaneously control the braking pressure pressures of both wheels which are connected to a pair of pressure-mediating circuits. However, such a system results in inferior performance as compared with a brake system having three or four pairs of control lines.

(4) European Patent No. 51801 discloses a diagonal type dual brake circuit comprised of a decreased number of control lines, a single-type pressure modulator to provide for a pressure mediating circuit, and a so-called Select-High/Select-Low principle is used to temporarily determine and control the amount of pressure on both circuits in order to favorably regulate the braking pressure under varying circumstances. However, this system does not provide for the desired degree of stability and steerability because both stability and steerability deteriorate as the stopping distance is decreased.

SUMMARY OF THE INVENTION

The present invention is an antiskid control device comprised of pressure-mediating circuits which are provided in two hydraulic lines leading from a master cylinder which lines are each diagonally connected to brakes at each of two wheels, one front and one rear, an inlet valve interposed in each pressure-mediating circuit upstream of either brake, and an outlet valve interposed in each return circuit downstream of both brakes. The inlet and outlet valves are controlled based on the speed of each of the wheels individually. The device is characterized by the addition of an opening/closing valve which is interposed in the pressure-mediating circuit between the connection to the front wheel brake and the connection to the corresponding rear wheel brake and which is open when not operated. The device is further characterized by a control circuit which controls the opening and closing of this opening/closing valve, thus making it possible to independently control the braking pressure of the front and rear wheel brakes, thus providing matched pairs via the pressure-mediating circuits.

It is a primary object of the invention to provide an antiskid control device which can simultaneously shorten stopping distances while securing the stability and steerability of the vehicle.

Another object of the present invention is to provide an antiskid braking device with opening/closing valves which can be controlled so as to independently open and close relative to valves forming antiskid valve units in pressure-mediating circuits.

Advantages of the present antilock braking device are that it allows for braking while simultaneously maintaining stability, steerability and a shortened stopping distance on the road with varying surface conditions.

A feature of the present invention is that it allows for the independent control of the antiskid effects on the right and left wheels in a manner which a conventional dual circuit diagonal type antiskid brake system can not.

Another advantage is that the system allows for the above advantages when the front and rear wheels are on a road with varying conditions (for example, moving from a low coefficient of friction area to a high coefficient of friction surface) because the system is designed so that the front wheel braking pressure can be quickly increased while low braking pressure is maintained on the rear wheels. Therefore, the present device makes it possible to carry out braking on a variety of surfaces while simultaneously maintaining stability, steerability and shortened stopping distance.

These and other objects, advantages and features of the present invention will become apparent to those persons skilled in the art upon reading the details of the structure operation and usage of the present antiskid device, reference being made to the accompanying drawings forming a part hereof wherein like numerals refer to like components throughout.

BRIEF DESCRIPTION OF THE DRAWINGS

This invention may be better understood and its numerous objects, advantages and features will become apparent to those skilled in the art by reference to the accompanying drawings as follows.

DETAILED DESCRIPTION OF THE PREFERRED EMBODIMENTS

Before the present antiskid device and its operation are described, it is to be understood that this invention is not limited to the particular structural components and means of operation described as such components and means of operation may, of course, vary. It is also to be understood that the terminology used herein is for the purpose of describing particular embodiments only, and it is not intended to be limiting as the scope of the present invention will be limited only by the appended claims.

Unless defined otherwise, all technical and scientific terms used herein have the same meaning as commonly understood by one of ordinary skill in the art to which the present antiskid devices belong. Although a number of different mechanical and electromechanical components similar to those described herein can be interchangeably used with those described herein, the preferred components and their relationships are now described. All publications mentioned herein are incorporated herein by reference.

Figure 1:
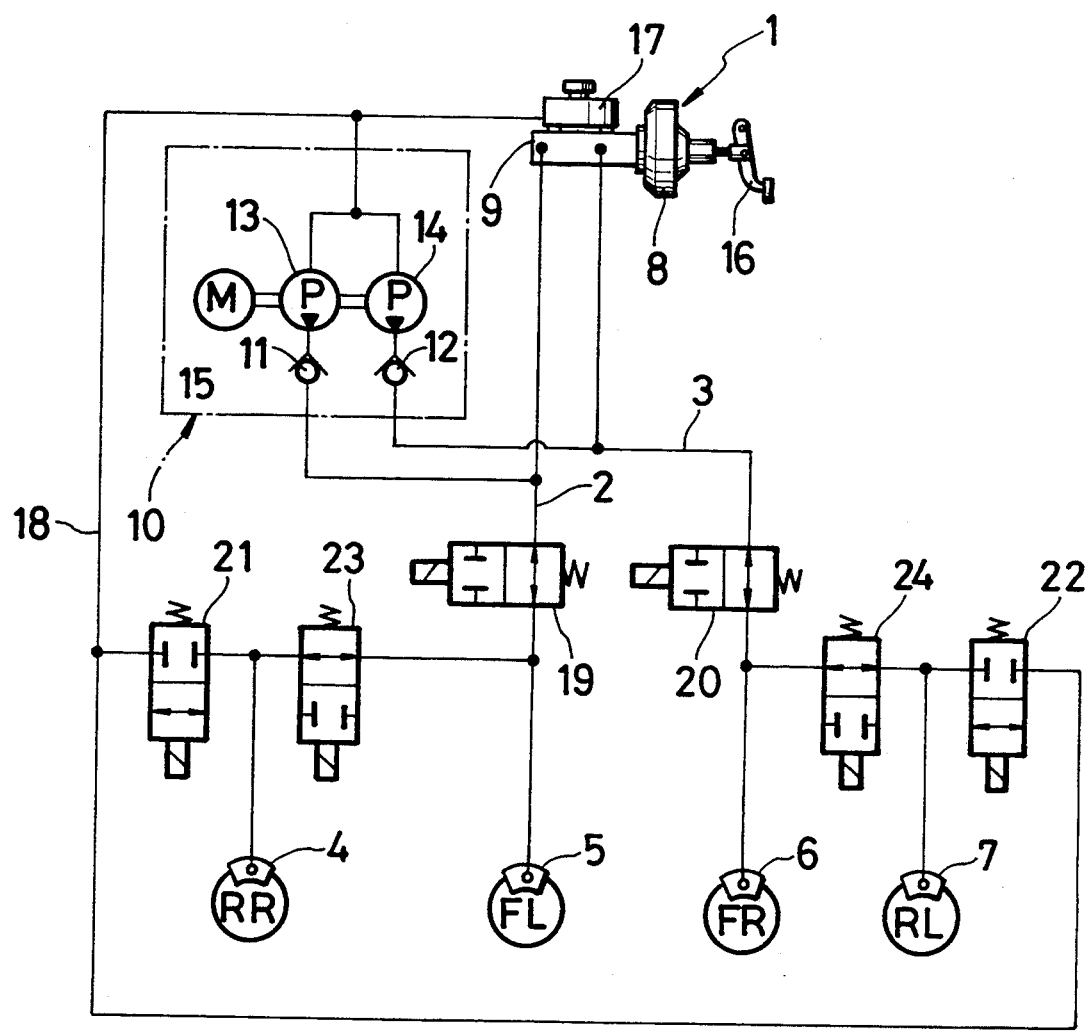
FIG. 1 is a schematic view of the antiskid device of the present invention.

Referring now to the drawings and to FIG. 1 in particular, the braking pressure generator designated by the number 1 is described.

A. Structure of the Device of FIG. 1

The braking pressure generator 1 is comprised of first and second pressure-mediating circuits designated respectively as 2, 3 which are separated depending on fluid pressure. Via the first and second pressure-mediating circuits 2, 3 wheel brakes 4, 5, 6 and 7 for front wheels FL, FR and rear wheels RR, RL are diagonally connected. The braking pressure generator 1 is further comprised of a power booster 8, a master cylinder 9 and a reservoir 17.

Numeral 10 is an auxiliary pressure source which supplies auxiliary energy to the pressure-mediating circuit 2, 3. It consists of check valves 11, 12, fluid pressure pumps 13, 14 and an electric motor 15 for driving the fluid pressure pumps 13, 14.

The reservoir 17 acts as the fluid supply for the master cylinder 9 and is also connected so as to supply fluid to the suction side of the fluid pressure pumps 13, 14, and further connected to a return circuit 18 to make it possible to correct the fluid pressure.

Numerals 19, 20 designate inlet valves while numerals 21, 22 designate outlet valves. The valves are interposed in the first and second pressure-mediating circuits 2, 3 in a manner so as to provide for an antiskid valve unit.

The valves 19, 20, 21 and 22 function as direction control valves at two ports and two positions and are electromagnetically operated. The details of the devices for controlling the valves 19–22 as well as their controlling systems (e.g., sensor detecting rotation of wheels, and electronic circuits and devices for computational arithmetical processing of the wheel sensor signals and controlling the switching of electromagnetic valves 19–22) are known to those skilled in the art and therefore need not be described herein. The inlet valves 19 and 20 are normally opened, while the outlet valves 21 and 22 and normally closed when the device is not in operation.

B. Functional Interrelationship of the Components

The present invention is characterized by interposing controllable opening/closing valves 23, 24 on the first and second pressure-mediating circuits 2, 3 in a manner which is independent of the aforesaid valves 19, 20, 21 and 22. Each opening/closing valve 23 or 24 is an electromagnetically operated valve used to realize a circuit which can independently control the braking pressure of a pair of front and rear wheels via each pressure-mediating circuit 2 or 3.

Specifically, the opening/closing valve 23 is disposed along the first pressure-mediating circuit 2 running from the inlet valve 19 to the wheel brake 4 of the rear wheel RR, and the opening/closing valve 24 is disposed along the second pressure-mediating circuit 3 running from the inlet valve 20 to the wheel brake 7 of rear wheel RL.

By positioning the components in this manner, the braking pressures of the rear wheels RR and RL can be suitably controlled independent of the front wheels FL and FR, thereby shortening the stopping distance while simultaneously maintaining stability and steerability.

The opening/closing valves 23, 24 are set in an open position when they are not in operation. A determination of when the opening/closing valves 23, 24 should be controlled is based on a detected change in the speed of each rear wheel of a vehicle (slip ratio and deceleration).

More particularly, a determination of when the opening/closing valves 23, 24 are to be switched is made in the following manner. On the same control circuit, when the front wheel FL does not tend to lock but only the rear wheel RR tends to lock (or is definitely locked), the applicable opening/closing valve 23 is closed, and the outlet valves 21 of the same line is controlled so that it is closed (for pressure hold) or opened (for pressure decrease). Regardless of the state of the rear wheel RR, when the front wheel FL of the same control circuit tends to lock (requiring a pressure decrease), the opening/closing valve 23 is controlled so as to open the valve 23. In such a situation, the inlet valve 19 is closed and the outlet valve 21 opened.

In the second pressure-mediating circuit 3, the control is made under the same conditions as in the above-exemplified first pressure-mediating circuit 2. That is to say, each opening/closing valve 23 or 24 is structured to be independently controlled to be opened or closed.

Under the following conditions, the opening/closing valves 23, 24 return to a constantly open state:
(1) When neither the rear wheel RR or RL tends to lock or does not lock, a braking-pressure increase in the rear wheel RR or RL is required, and the valves open for a short period.
(2) When either the front wheel FL or FR of each circuit tends to lock, requiring a pressure decrease, the front wheel FL or FR requires that the braking pressure be decreased via the opening/closing valve 23 or 24, and the valves open for a short period.
(3) In the state of antiskid control, when a driver stops or completes braking and all wheels show no locking tendency, or when a vehicle completely stops, completing antiskid control, the valves revert to a constantly open state.
(4) When the fail-safe function (sensor failure, electromagnetic valve failure, etc.) possessed by the antiskid control system is activated, the antiskid control is deactivated and the system reverts to normal braking operation. In such a situation the electrical operation is completely turned off, and the opening/closing valve 23 or 24 is kept open.

In other words, when the front and rear wheels of the same control circuit are braked on the road with varying coefficients of friction, the braking pressure of the front wheels FL and FR are preferably controlled so as to generate a higher pressure than those of the rear wheels RR and RL (pressure increase, holding, or decrease). Each opening/closing valve 23 or 24 is preferably configured to open or close independently of the inlet valves 19, 20 and the outlet valves 21, 22.

C. Operation of the Antiskid Braking Device

The operation of the antiskid control device will now be described to include the details of how it operates under varying road conditions regarding the road the front and rear wheels are in contact with.

A fluid pressure is generated from the braking pressure generator 1 when a brake pedal 16 is pressed down. This pressure is transmitted to the wheel brakes 4, 5, 6 and 7 via the first and second pressure-mediating circuits 2, 3, thus causing the front wheels FL, FR and rear wheels RR, RL to brake.

The following examples are put forth so as to provide those of ordinary skill in the art with a complete disclosure and description of how to make and operate the antiskid device systems of the present invention and are not intended to limit the scope of what the inventor regards as his invention. Efforts have been made to insure accuracy with respect to number used (e.g., coefficients of friction), but some experimental errors and deviation must be accounted for.

Example 1

The antiskid control is obtained based on the skidding conditions of each wheel:
Front right wheel (FR): $\mu=0.8$
Front left wheel (FL): $\mu=0.2$
Rear right wheel (RR): $\mu=0.8$
Rear left wheel (RL): $\mu=0.2$
(wherein $\mu$ is the coefficient of friction).

The above combination of coefficients of friction is based on the assumption that the left wheels are in a frozen area (e.g., ice) and the right wheels on an asphalt pavement (no ice).

When the coefficient of friction between each wheel and the road is as listed above, it is necessary to control (or increase) the braking pressure to a greater degree on the high coefficient of friction side and to decrease the braking pressure on the low coefficient of friction side. More braking pressure can be applied on the asphalt side without causing skidding, thus allowing greater stopping force to be applied on the asphalt side and less force on the ice side. The quickest stopping is obtained while simultaneously maintaining the stability and steerability of the vehicle.

An example of how the device might operate is as follows. The left wheels have a low coefficient of friction. As a result, the front wheel FL is detected as skidding. The inlet valve 19 is closed in response to the detected signal. The opening/closing valve 23 is in an open position or in an inoperative state. Accordingly, the braking pressure is controlled by the opening/closing operation of the inlet and outlet valves 19, 21.

Therefore, the braking pressure of the rear wheel RR which belongs to the first pressure-mediating circuit 2 becomes substantially the same as that of the front wheel FL. On the other hand, in the second pressure-mediating circuit 3, which is connected to the front wheel FR (which has a high coefficient of friction), the rear wheel RL is first detected as skidding because it is on the road area (e.g., ice) with a low coefficient of friction. The opening/closing valve 24 which is in a constantly open state is closed in response to the detected signal, and the braking pressure of the front wheel FR (which requires a higher pressure due to the higher coefficient of friction on the asphalt) is increased.

When the front wheel FR is detected as skidding (or computation reveals it is about to skid), the inlet valve 20 is closed, the front wheel FR is allowed to hold its braking pressure as is, and the skidding tendency is continuously monitored to detect if the tendency toward skidding has been decreased or increased and adjustments are made as needed.

While maintaining the front wheel FR's braking pressure as is, the opening/closing valve 24 is kept in a closed state, and the outlet valve 22 is in a closed position. Thus, the rear wheel RL's braking pressure is maintained as is, or if the rear wheel RL begins to skid even more, the outlet valve 22 is opened to decrease the braking pressure.

If the front wheel FR continuously indicates that the skidding tendency is advancing, the opening/closing valve 24 is switched to the open position and at the same time the outlet valve 22 is opened to decrease the braking pressures of the front wheel FR and the rear wheel RL to about the same level. Then, when the rear wheel RL recovers from the skidding tendency, requiring a pressure increase, the outlet valve 22 is closed and the opening/closing valve 24 is switched pulsationally to introduce pressure through the inlet valve 20. Next, except in the case where pressure reduction of the front wheel FR is required, the braking pressure of the front wheel FR is independently controlled. This is accomplished by opening and closing the inlet valve 20 and the opening/closing valve 24. The braking pressure of the rear wheel RL is independently controlled by opening and closing the opening/closing valve 24 and the outlet valve 22.

Example 2

The following provides a description of a different road situation than that described above. More specifically, the following is a description of a situation wherein the vehicle advances from a low coefficient of friction area to a high coefficient of friction area.
Both front wheels (FL, FR): $\mu=0.8$
Both rear wheels (RR, RL): $\mu=0.2$
When all four wheels are in contact with a road with a low coefficient of friction and the braking pressures of all wheels belonging to the first and second pressure-mediating circuits 2, 3 are low and controlled to be substantially the same, if the front wheels advance and come into contact with a high frictional road surface, the skidding tendency of both front wheels FL, FR will quickly disappear. At the point contact with the high frictional road surface is detected and it becomes necessary to quickly increase the braking pressures on the front wheels FL, FR, both rear wheels RR, RL are still on the low frictional road surface. Accordingly, the braking pressure must still be kept low in order to prevent "wheel lock," i.e., rear wheel skidding.

In this case, both of the opening/closing valves 23, 24 are switched to the closed position and at the same time both of the inlet valves 19, 20 are switched to the open position for a relatively long period. Thus, the above-mentioned requirements are satisfied.

D. The Embodiment of FIG. 2

Figure 2:
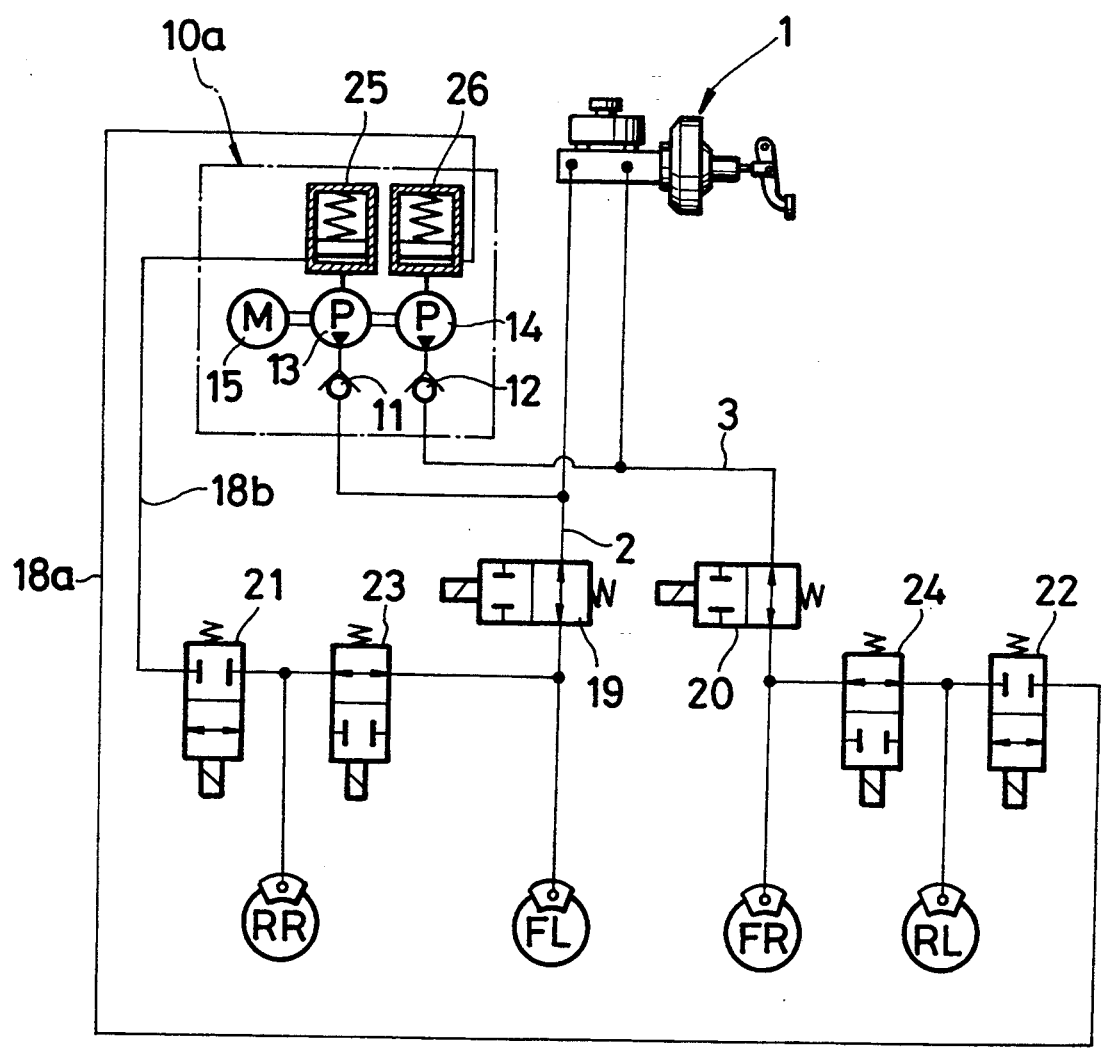
FIG. 2 is a schematic view of another embodiment of the antiskid device of the present invention.

FIG. 2 shows another embodiment of the present invention.

This embodiment illustrates that auxiliary reservoirs 25, 26 are incorporated into an auxiliary pressure source 10a, return circuits 18a, 18b which are in communication with the outlet valves 21, 22 which are connected to the reservoirs 25, 26. The wheel brake fluid pressure is released under nonatmospheric pressure.

The auxiliary reservoirs 25, 26 include a piston and a return spring which make it possible to provide an airtight separation of the fluid chamber from the atmosphere. The return spring is set with enough tension to resist the sliding resistance of the piston.

The residue pressures in the auxiliary reservoirs 25, 26 are set at a level not higher than the minimum fluid pressure required to control the wheel brakes. When the wheels recover from skidding or lock-up and the front wheels or front and rear wheels connected to the pressure-mediating circuits 2, 3 require that the fluid pressure be increased, the recovered fluid in the auxiliary reservoirs 25, 26 is supplied to the pressure-mediating circuits 2, 3 through fluid pressure pumps 13, 14 by driving a motor 15. Simultaneously, the inlet valves 19, 20 are switched to a nonoperational position, thus increasing the wheel braking pressure. In this embodiment, the function and effect of braking are identical with those described above.

The instant invention has been shown and described herein in what is considered to be its most practical and preferred embodiments. It is recognized, however, that departures may be made therefrom which are within the scope of the invention, and that obvious modifications will occur to one skilled in the art upon reading this disclosure.

What we claim is:

1. An antiskid control device, comprising:
   two pressure-mediating circuits provided in two lines from a master cylinder, each circuit being first connected to a front wheel brake and then connected to the diagonal rear wheel brake and then connected to a reservoir;
   an inlet valve interposed in each pressure-mediating circuit between the master cylinder and the front wheel brake;
   an outlet valve interposed in each circuit between the rear wheel brake and the reservoir wherein the inlet and outlet valves are controlled based on wheel speed;
   a normally open opening/closing valve interposed in each pressure-mediating circuit between the line which connects the inlet valve and the front wheel brake, and the line which connects the outlet valve and the rear wheel brake, said opening/closing valve being controlled based on wheel speed so as to close and permit the pressure on the front wheel brake to be held and the pressure on the rear wheel brake to be bled off through the outlet valve thereby maintaining the pressure on each rear wheel brake at a pressure equal to or less than the pressure on each front wheel brake;
   an auxiliary pressure source interposed between the reservoir and the inlet valve which pressure source provides auxiliary pressure to the two pressure-mediating circuits; and
   a control circuit which controls opening and closing of said opening/closing valve in a manner such that, while pressure is applied to both a front wheel and the rear wheel on the same circuit, by closing the opening/closing valve the pressure on the front wheel is increased independently of the pressure on the rear wheel and the pressure on the rear wheel is decreased independently of the pressure on the front wheel.

2. The antiskid control device as claimed in claim 1, wherein the auxiliary pressure source is comprised of a fluid pressure pump driven by a motor.

3. The antiskid control device of claim 1, wherein the auxiliary pressure source is comprised of two fluid pressure pumps which pumps are driven by an electric motor.

4. An antiskid control device, comprising:
   two pressure-mediating circuits provided in two lines from a master cylinder, each circuit being first connected to a front wheel brake and then connected to the diagonal rear wheel brake and then connected to a reservoir;
   an inlet valve interposed in each pressure-mediating circuit between the master cylinder and the front wheel brake;
   an outlet valve interposed in each circuit between the rear wheel brake and the reservoir wherein the inlet and outlet valves are controlled based on wheel speed;

a normally open opening/closing valve interposed in each pressure-mediating circuit between the line which connects the inlet valve and the front wheel brake, and the line which connects the outlet valve and the rear wheel brake, said opening/closing valve being controlled based on wheel speed so as to close and permit the pressure on the front wheel brake to be held and the pressure on the rear wheel brake to be bled off through the outlet valve thereby maintaining the pressure on each rear wheel brake at a pressure equal to or less than the pressure on each front wheel brake;

an auxiliary pressure source connected to return circuits providing fluid connection with the outlet valves, the auxiliary pressure source being capable of providing auxiliary pressure to the two pressure-mediating circuits; and a control circuit which controls opening and closing of said opening/closing valve in a manner such that, while pressure is applied to both a front wheel and the rear wheel on the same circuit, by closing the opening/closing valve the pressure on the front wheel is increased independently of the pressure on the rear wheel and the pressure on the rear wheel is decreased independently of the pressure on the front wheel.

5. The antiskid control device of claim 4, wherein the auxiliary pressure source is comprised of an auxiliary reservoir, and a fluid pressure pump driven by an electric motor.

6. The antiskid control device of claim 4, wherein the auxiliary pressure source is comprised of two auxiliary reservoirs and two fluid pressure pumps driven by an electric motor wherein each of the auxiliary reservoirs is in fluid connection with an outlet valve.

* * * * *